Figure 1:
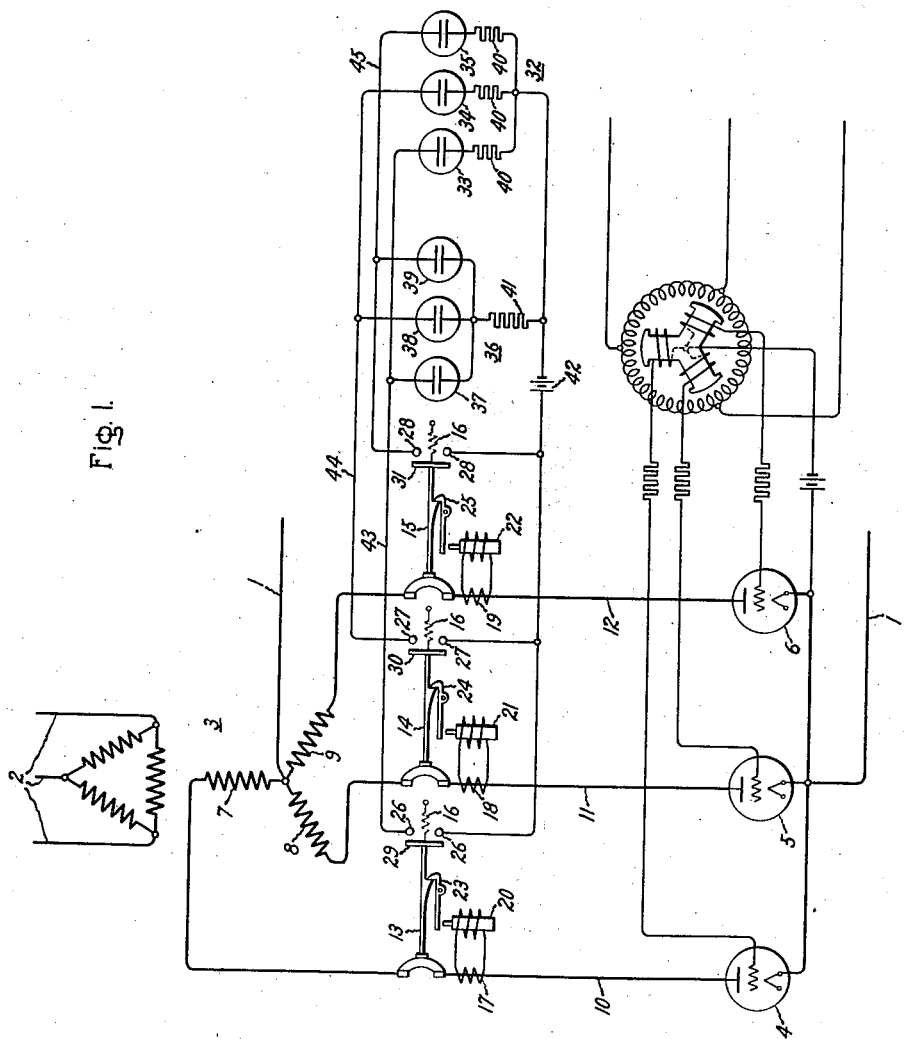

Aug. 27, 1940.  M. M. MORACK  2,213,091
ELECTRIC SIGNALING AND INDICATING SYSTEM
Filed Feb. 24, 1936   2 Sheets-Sheet 1

Inventor:
Marvin M. Morack,
by Harry E. Dunham
His Attorney.

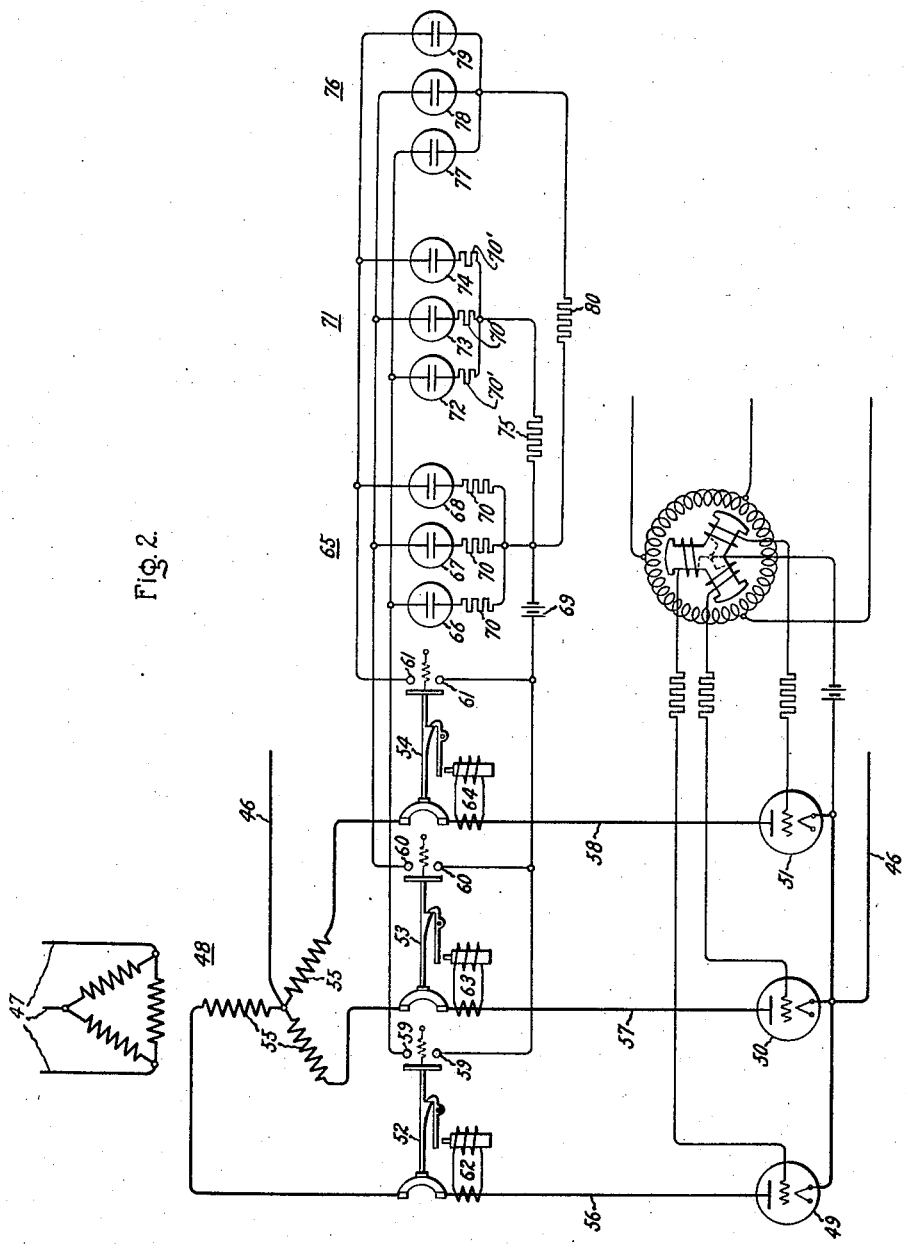

Patented Aug. 27, 1940

2,213,091

UNITED STATES PATENT OFFICE 2,213,091

ELECTRIC SIGNALING AND INDICATING SYSTEM

Marvin M. Morack, Schenectady, N. Y., assignor to General Electric Company, a corporation of New York Application February 24, 1936, Serial No. 65,349

2 Claims. (Cl. 177—311)

My invention relates to electric signaling and indicating systems, and more particularly to electric signaling and indicating systems adapted to indicate the occurrence of a plurality of events and the sequence of such events.

In electric circuits it is frequently desirable to provide signaling and indicating systems for indicating in which of a plurality of electric circuits electrical conditions of a predetermined character have occurred, and it is also desirable to provide means for indicating the circuits and the sequence in which the electrical conditions have occurred in the various circuits. There has also been evidenced a need for an electrical circuit to indicate which of a plurality of devices have operated and for indicating the sequence in which the devices have operated. The need for this type of system is particularly great where the devices operate in rapid succession.

It is an object of my invention to provide an improved electric signaling and indicating system to show in which circuits of a plurality of electric circuits electrical conditions of a predetermined character have occurred.

It is another object of my invention to provide an electric signaling and indicating circuit to indicate the sequence in which a plurality of events have occurred.

It is still another object of my invention to provide an improved electric signaling and indicating system to indicate the electric circuits in a plurality of electric circuits in which electrical impulses of a predetermined character have occurred and to indicate the sequence in which the electrical impulses have occurred.

It is a further object of my invention to provide an improved electrical system to indicate which devices of a plurality of devices have operated and to indicate the sequence in which the devices have operated.

In accordance with the illustrated embodiment of my invention I provide a signaling and indicating system to indicate in which circuits of a plurality of circuits electrical conditions of a predetermined character have obtained and to indicate the sequence in which the conditions have obtained on the various electrical circuits. I have illustrated my invention as applied to an electric valve translating circuit for indicating the sequence in which the main power valves arc-back. To accomplish this result I provide a plurality of groups of glow discharge valves, which afford an indication of the first, second and third power valves which are subjected to an arc-back or reverse current condition.

For a better understanding of my invention, together with other and further objects thereof, reference may be had to the following description taken in conjunction with the accompanying drawings, and its scope will be pointed out in the appended claims.

Fig. 1 of the accompanying drawings diagrammatically illustrates an embodiment of my invention as applied to an electric translating circuit to indicate the electric circuits in which electrical conditions of a predetermined character have occurred and to indicate that electric circuit in which the first electrical condition of that character has occurred. Fig. 2 of the accompanying drawings shows diagrammatically a modified embodiment of my invention as applied to an electric translating circuit and which is arranged to provide an indication of the sequence in which three electric circuits experience a predetermined electrical condition.

Referring now to Fig. 1 of the accompanying drawings, there is shown an embodiment of my invention as applied to an electric translating circuit for supplying uni-directional current to the load circuit 1 from a poly-phase alternating current circuit 2, through a transformer 3 and electric valves 4, 5 and 6. Secondary windings 7, 8 and 9 of the transformer 3 are connected through electric circuits 10, 11 and 12, respectively, and circuit interrupting devices 13, 14 and 15 to the associated electric valves 4, 5 and 6, respectively. To disconnect the transformer 3 from the electric valves 4, 5 and 6 I employ interrupting devices 13, 14 and 15 which are normally biased to the open circuit position by means of springs 16, and which are arranged to be operated to the open circuit position by means of a tripping and operating mechanism comprising electro-responsive windings 17, 18 and 19, plungers 20, 21 and 22, and latches 23, 24 and 25, respectively. The interrupting devices 13, 14 and 15 are provided with auxiliary sets of stationary contacts 26, 27 and 28, respectively, and with movable contacts 29, 30 and 31, respectively. It will be understood that the electro-responsive windings 17, 18 and 19 may be made responsive to any desired operating condition such as overload, reverse current, excessive voltage, arc-back, speed, etc., depending upon the nature of the circuit or device and the condition to be controlled.

To provide a system for indicating which circuit of the electric translating system has experienced electrical impulses of a predetermined character, I employ a group 32 of voltage-responsive elements 33, 34 and 35, such as glow discharge valves. And to indicate in which electric circuit of the electric translating arrangement the first electrical impulse has occurred, I employ a group 36 of voltage-responsive devices 37, 38 and 39, such as glow discharge valves. The glow discharge valves 33, 34, 35 and 37, 38, 39 may be of the conventional type, the characteristics of which are well known to those skilled in the art. These glow valves are characterized by requiring a predetermined critical minimum potential to effect ionization of the valves and hence to render the valves conductive. It will be well understood by those skilled in the art that if a potential exceeding the characteristic minimum potential is impressed upon the terminals of the valves, the valves will be rendered conductive and the current flowing through the valves will be limited only by the internal resistance of the valves. It will be further understood that after valves of this type have been rendered conductive by the application of a voltage exceeding the minimum critical potential, the electric valves may be maintained conductive by the application of a potential considerably below the minimum critical potential. Since the valves have a negative resistance-current characteristic, it is necessary to employ current limiting means such as resistances connected in series with the valves to maintain the current within predetermined safe limits to prevent destruction of the valves. To accomplish this result I employ current limiting resistances 40 connected in series with the glow discharge valves 33, 34 and 35 and an impedance element such as a current limiting resistance 41 connected in series with the group of valves 36. Predetermined glow discharge valves in the groups of valves 32 and 36 are arranged to be energized from a direct current source 42 through the auxiliary sets of associated stationary and movable contacts 26, 29; 27, 30; 28, 31, upon the operation of circuit interrupting devices 13, 14 and 15.

Glow discharge valves 33 and 37 are connected to be energized from the source of current 42 through the auxiliary set of contacts 26 and 29 of circuit interrupter 13 through a conductor 43. Glow discharge valves 34 and 38 are connected to be energized from the source of current 42 through the auxiliary set of contacts 27 and 30 of circuit interrupter 14 through a conductor 44; and glow discharge valves 35 and 39 are connected to be energized from the source of current 42 through the auxiliary set of contacts 28 and 31 of circuit interrupter 15 through a conductor 45. It will be understood, therefore, that glow discharge valves 33 and 37 may be arranged to indicate the condition of circuit-interrupting device 13, and glow discharge valves 34 and 38, and 35 and 39 may be connected to indicate a condition of circuit-interrupting devices 14 and 15, respectively.

The value of the resistance 41 is so chosen that after one glow discharge valve of the group 36 has been energized, the voltage drop across the resistance 41 will be great enough to reduce the resultant potential effective in said parallel circuit to a value below the critical minimum operating potential of the glow discharge valve. It, therefore, will be readily apparent that after the first glow valve has been rendered conductive the resultant potential acting upon the other glow discharge valves within the group will be ineffective and the other electric valves of group 36 will remain non-conductive upon the occurrence of subsequent predetermined electrical conditions or impulses.

The operation of the embodiment of my invention as represented in Fig. 1 may be best explained by considering the system when the translating circuit is supplying energy from the alternating current circuit 2 to the direct current load circuit 1 through the transformer 3 and electric valves 4, 5 and 6. During normal operation of the translating circuit, the circuit interrupting devices 13, 14 and 15 will be retained in the closed circuit position by virtue of the latching mechanisms 23, 24 and 25, respectively. Circuit interrupting devices 13, 14 and 15 may be arranged to interrupt circuits 10, 11 and 12 upon the occurrence of overload, reverse current or upon the occurrence of any predetermined electrical condition of the system. During normal operation of the system the groups 32 and 36 of glow discharge valves will not be energized. Let it be assumed that due to some irregularity in the operation of the circuit, such as an overload, reverse current, or a short circuit condition in the windings of transformer 3 an electrical impulse of sufficient magnitude is established to induce in the winding 17 associated with circuit interrupting device 13 of circuit 10, a current which causes the tripping of latch 23. The auxiliary movable contact 29 associated with the circuit interrupting mechanism 13 is made to engage with the stationary contacts 26, thereby resulting in the energization of glow discharge valve 33 of group 32 and glow discharge valve 37 of group 36. Since the voltage impressed upon these valves from the source 42 is greater than the critical minimum ionizing potential of the valves, the valves will be rendered conductive.

Let it further be assumed that a subsequent electrical impulse occurs in circuit 11, so as to cause movement of the circuit interrupting device 14 to its open position. By virtue of such operation, the auxiliary movable contact 30 of the circuit interrupting device 14 will be made to engage the auxiliary stationary contacts 27 to effect application of a potential upon the terminals of glow discharge valves 34 and 38 of groups 32 and 36, respectively. Inasmuch as glow discharge valves 33, 34 and 35 are energized through suitable individual resistances 40, the potential effective across the terminals of glow discharge valve 34 may be maintained above the critical minimum ionizing potential and cause ionization of valve 34 even though valve 33 is conductive. However, since glow discharge valve 38 is energized in parallel with valves 37 and 39 through a resistance 41, the voltage impressed across the terminals of valve 38 may be smaller than the critical minimum ionizing potential of the valve and hence this resultant potential is ineffective to render it conductive.

Under these particular conditions, it will be apparent that the group 32 of glow discharge valves indicates that abnormal conditions have obtained in electric circuits 10 and 11 and that circuit interrupting devices 13 and 14 have been moved to the open circuit position. The group 36 of glow discharge valves indicates, inasmuch as valve 37 is conductive, that the irregularity and the incident electrical impulse first occurred in electric circuit 10 and that the associated circuit interrupting device 13 was the first to operate.

If it be assumed that abnormal electrical impulses occur in rapid succession in circuits 10, 11 and 12 in the order named, it will be understood that glow discharge valves 33, 34 and 35 of group 32 will be rendered conductive to indicate that such impulses have occurred in all of the circuits. Glow discharge valve 37 in group 36 will also be conductive to afford an indication that electric circuit 10 was the first to experience an electrical impulse. As a further example, if an electrical impulse incident to an abnormal condition of the circuit occurs first in circuit 11 and subsequent impulses occur in circuits 10 and 12, valves 33, 34 and 35 will be rendered conductive to show that irregularities have occurred in the operation of all circuits. Since circuit 11 was the first to experience the electrical impulse, glow discharge valve 38 of group 36 will be conductive and electric valves 37 and 39 will be non-conductive.

Referring now to Fig. 2, there is shown a modified embodiment of my invention as applied to an electric translating system for indicating the electric circuits in which electrical impulses of a predetermined character have occurred and for indicating the sequence in which the electrical impulses have occurred in the various circuits. Unidirectional current is supplied to the load circuit 46 from the polyphase supply circuit 47 through a transformer 48 and electric valves 49, 50 and 51. Circuit interrupting devices 52, 53 and 54 are arranged to connect the terminals of the secondary windings 55 of transformer 48 to electric valves 49, 50 and 51 through electric circuits 56, 57 and 58. The circuit interrupting devices 52, 53 and 54 are provided with auxiliary sets of contacts 59, 60 and 61, respectively, to energize predetermined voltage-responsive elements to be described hereinafter. Suitable electro-responsive devices 62, 63 and 64 are associated with circuit interrupting means 52, 53 and 54 to trip the circuit interrupting device upon the occurrence of predetermined electrical impulses in the associated electric circuits.

To provide an indication of the electric circuits in which electrical impulses of a predetermined character have occurred or for providing an indication of the position of the circuit interrupting devices 52, 53 and 54, I employ a group 65 of voltage-responsive elements 66, 67 and 68 energized from a source of potential 69 through suitable individual resistances 70. A group 71 of voltage-responsive elements 72, 73 and 74 energized through a resistance 75 is provided to indicate the first and second circuits of a plurality of circuits in which electrical impulses of a predetermined character have occurred. Individual resistances 70' are connected in series relation with electric valves 72—74 of group 71. Another group 76 comprising voltage-responsive elements 77, 78 and 79 energized from the source of current 69 through a resistance 80 is provided to indicate that circuit of a plurality of circuits which has been the first circuit to experience an electrical impulse of a predetermined character. The voltage-responsive elements 66 to 68, inclusive, 72 to 74, inclusive, and 77 to 79 inclusive, may be glow discharge valves of the type having a critical minimum-potential ionizing characteristic.

To arrange the group 71 to afford an indication of the first and second circuits, of circuits 56, 57 and 58, in which there have been electrical impulses of a predetermined character, I employ the resistance 75 having a value such that the voltage drop due to the current required by one value will not be great enough to reduce the resultant potential to a value below the critical minimum ionizing potential for the other valves in the group. However, after two valves in group 71 have been rendered conductive, the voltage drop of resistance 75 incident to the current of these two valves will reduce the effective potential available for the third valve to a potential below the critical minimum ionizing potential. In other words, only two valves of group 71 may be conductive at the same time.

The value of resistance 80, connected in series with the group 76 is of such a magnitude that only one of the valves may be conductive at the same time. Hence group 76 will indicate the first circuit to be subjected to an electrical variation of a predetermined character.

It will be understood that glow discharge valves 66, 72 and 77 are associated with electric circuit 56 and circuit-interrupter 52. Likewise, glow discharge valves 67, 73 and 78 are associated with circuit 57 and circuit-interrupter 53, and glow discharge valves 68, 74 and 79 are associated with circuit 58 and circuit-interrupter 54.

To explain the operation of the embodiment of my invention as illustrated in Fig. 2, the system may be first considered during normal operation, that is when the direct current load circuit 46 is being energized from the alternating current source 47. The circuit interrupting devices 52, 53 and 54 are adjusted to open upon the occurrence of a predetermined electrical condition of the electric circuits 56, 57 and 58. If it is assumed that an electrical impulse of a predetermined character occurs in electric circuit 56, circuit interrupting device 52 will be moved to the open circuit position to effect closure of the auxiliary sets of contacts 59. Upon closure of the auxiliary sets of contacts 59, a potential is applied to glow discharge valves 66, 72 and 77 of groups 65, 71 and 76, respectively. As explained above in regard to the operation of the embodiment of my invention as shown in Fig. 1, electric valves 66, 72 and 77 will be rendered conductive to afford an indication of the fact that an electrical impulse of predetermined character has occurred in the electric circuit 56. If it further be assumed that a subsequent electrical impulse occurs in electric circuit 57, circuit interrupting device 53 will be operated to the open circuit position, effecting thereby application of a voltage to glow discharge valves 67, 73 and 78 of groups 65, 71 and 76, respectively. As explained above, inasmuch as the glow valve 67 is connected in series with an individual resistance 70, the resultant voltage impressed upon the terminals of the valves 67 will be greater than the critical minimum potential required to effect ionization of this valve and, since the value of resistance 75 is relatively small as compared with the value of resistance 80, the drop in potential incident to the presence of this resistance 75 in series with the group 71 will not be of sufficient value to reduce the voltage impressed across the terminals of valve 73 to a value below the critical minimum potential for valve 73. Of course, glow discharge valve 67 in group 65 will also be rendered conductive. In other words, electric valve 73 will be rendered conductive, the resistances 70' serving to maintain the voltage impressed on the valves sufficiently high so that two of the valves in group 71 may be rendered conductive. However, since the value of resistance 80 is comparatively large, the voltage impressed across the terminals of electric valve 78 will be less than the minimum critical potential for that valve and hence valve 78 will remain non-conductive. If it be still further assumed that a third electrical impulse occurs subsequently in electric circuit 58 there will be an application of voltage to glow discharge valves 68, 74 and 79. As explained above, valve 68 will be rendered conductive but valves 74 and 79 will remain non-conductive.

Under the conditions assumed, it will be apparent that group 64 indicates that certain impulses have occurred in circuits 56, 57 and 58 since glow discharge valves 66, 67 and 68 are conductive. Since glow valves 72 and 73 of the group 71 are conductive, there is an indication that electric circuit 57 was the circuit to receive the second electrical impulse. And, lastly, since glow valve 77 of group 76 is conductive, there is afforded an indication that the circuit 56 was the circuit in which the first electrical impulse had occurred.

It will be understood that the group 65 will under all conditions indicate all those circuits in which electrical impulses have occurred, group 71 will indicate those circuits in which the first and the second electrical impulses have occurred, and group 76 will indicate that circuit in which the first impulse has occurred. It, therefore, will be apparent that by inspection one may determine the sequence in which the electrical impulses have occurred in the various circuits or may determine the condition of the circuit interrupting devices 52, 53 and 54.

While I have shown my invention as applied to an indicating system for an electric translating circuit for supplying energy to a direct current load circuit from an alternating current circuit, it will be understood that my invention in its broader aspects may be applied generally to systems in which it is desirable to obtain an indication as to which of a plurality of devices have operated and the sequence in which the devices have operated. Although I have shown the use of glow discharge valves in the capacity of voltage-responsive elements, it will be readily understood that I may use other elements having similar characteristics.

Although I have shown my invention as comprising means to indicate all the circuits of a plurality of circuits to experience certain predetermined electrical impulses and to indicate in addition the first and second circuits to be so affected, it will readily occur to those skilled in the art that my invention is not limited to any particular number of groups or number of circuits for which the order is indicated and may be readily embodied in other forms to indicate the third, fourth, etc. circuits which have experienced predetermined conditions. Such an arrangement may be obtained by providing additional groups of valves and utilizing resistances of predetermined values connected in series with the various additional groups in accordance with the disclosure of the embodiment shown in Fig. 2. In such additional embodiments the values of resistances in circuit with each additional group must be chosen to provide the required voltage drop to reduce the resultant voltage effective in the group to a value below the critical minimum potential for the valves when the desired number of valves have become conductive.

While I have shown and particularly described certain embodiments of my invention and certain methods of operation embraced therein for the purpose of explaining its principle and showing its application, it will be obvious to those skilled in the art that many modifications are possible without departing from my invention, and I aim, in the appended claims, to cover all such modifications and variations as fall within the true spirit and scope of my invention.

What I claim as new and desire to secure by Letters Patent of the United States is:

1. In combination, means for indicating the sequence of more than two occurrences comprising a plurality of groups of glow discharge valves having a critical minimum potential ionizing characteristic, a source of electric potential having a value greater than said critical potential, a plurality of impedance elements each connected in series relation between said source and a different one of said groups, means actuated upon the first occurrence for effecting selective application of a predetermined component of potential of said source to a predetermined glow discharge valve in each of said groups due to the flow of current through the connected impedance element upon said first occurrence to render conductive said predetermined glow discharge valve in each of said groups, means actuated upon the second occurrence for effecting selective application of a predetermined component of potential of said source to another predetermined glow discharge valve in all but one of said groups due to the flow of current through the connected impedance elements upon said second occurrence to render conductive said predetermined glow discharge valve in all but one of said groups, and means actuated upon the third occurrence for effecting selective application of a predetermined component of potential of said source to a different predetermined glow discharge valve in all but two of said groups due to the flow of current through the connected impedance elements upon said third occurrence to render conductive said predetermined glow discharge valve in all but two of said groups.

2. In combination, means for indicating the sequence of more than two occurrences comprising at least one group of voltage responsive elements having a critical minimum operating potential characteristic, a source of potential, means comprising impedance elements connected between said source and said voltage responsive elements to control selectively the component of potential of said source impressed thereon due to the flow of current through the impedance elements and the connected voltage responsive elements to permit operation of only a predetermined number of voltage responsive elements in each of said groups, more than one but less than all elements in at least one of said groups, and means actuated upon each occurrence for connecting said source to the connected voltage responsive elements through said associated impedance elements to impress selectively across said last mentioned elements a predetermined component of potential of said source.

MARVIN M. MORACK.